Jan. 23, 1968 KIICHI KOMATSUBARA 3,365,677

FORCE TUNABLE LOW TEMPERATURE SOLID STATE OSCILLATOR

Filed Feb. 23, 1966 2 Sheets-Sheet 1

INVENTOR
KIICHI KOMATSUBARA

BY Paul M. Craig, Jr.
ATTORNEY

Jan. 23, 1968 KIICHI KOMATSUBARA 3,365,677

FORCE TUNABLE LOW TEMPERATURE SOLID STATE OSCILLATOR

Filed Feb. 23, 1966 2 Sheets-Sheet 2

INVENTOR
KIICHI KOMATSUBARA

BY Paul M. Craig, Jr.
ATTORNEY

United States Patent Office 3,365,677
Patented Jan. 23, 1968

3,365,677
FORCE TUNABLE LOW TEMPERATURE SOLID STATE OSCILLATOR

Kiichi Komatsubara, Kodaira-shi, Japan, assignor to Hitachi, Ltd., Tokyo, Japan, a corporation of Japan Filed Feb. 23, 1966, Ser. No. 529,467
Claims priority, application Japan, Mar. 5, 1965, 40/12,380
11 Claims. (Cl. 331—65)

ABSTRACT OF THE DISCLOSURE

A force tunable low temperature solid state oscillator comprising a compensated semiconductor body kept at a temperature lower than the boiling point of nitrogen. Means are provided for supplying direct current through the semiconductor body and for applying a magnetic field in a direction substantially transverse to the direction of flow of current through the semiconductor body. Output oscillations are derived from the semiconductor body through an appropriate wave guide structure or second semiconductor body connected to the first semiconductor body. The structure is completed by adjustable means for applying a mechanical force to the semiconductor body which is independent of the environment in which the device is disposed for controlling the oscillation frequency of the oscillator.

This invention relates to a solid state oscillator and more particularly to an oscillator of this type whose basic component is an oscillation device made from such material as germanium, silicon or a III–V intermetallic compound such as InSb.

It is already known in the art that devices made from germanium, silicon or InSb develop a negative resistance when a high electric field is applied to these devices at low temperature and this negative resistance results from current amplification due to impact ionization between electrons or holes and impurity atoms or to impact multiplication between energy bands. It is also widely known in the art that these devices develop oscillation when a magnetic field is applied in a direction transverse to the direction of current flowing across these devices under such conditions, and this oscillation appears externally of the devices as a voltage oscillation, especially when a constant current bias is imparted thereto.

The tendency to give this negative resistance is quite remarkable in the case of a specimen of a compensated semi-conductor. The term "compensated" as used herein denotes the fact that the electrical characteristics of a p- or n-type impurity in the semiconductor material are cancelled by the electrical characteristics of an n- or p-type impurity, and the degree in which such impurity is compensated is called a compensation ratio. After negative resistance break-down is developed, the current flows locally through the specimen in a filament-like manner. Under this condition of the magnetic field and electric field, conduction carriers in the filament run out in a direction transverse to the direction of the flow of the filament-like current. The carriers have a velocity $V_H$ which can be expressed by $$V_H = C\frac{\vec{E}\times\vec{B}}{B^3}$$

where, C is the velocity of light, $\vec{F}$ is the strength of the electric field components running in a direction in parallel with the direction of the current flow, $\vec{B}$ is the strength of the magnetic field components running in a direction perpendicular to the direction of the current flow, and B is the absolute value of the applied magnetic field. When, however, a certain critical velocity is reached, a Coulomb field around the ionized impurities in the specimen exerts on conduction carriers momentum change to cause Bremsstrahlung. Therefore, owing to the momentum change and carrier-carrier scattering which is characteristic of Bremsstrahlung, a density wave of the free carriers is caused which is dependent on the size of the specimen. Although the Coulomb field established around the ionized impurities is not essential to such Bremsstrahlung, the presence of the ionized impurities is quite effective in enhancing the effects of Bremsstrahlung and thus, the energy of collective motion of the conducting carriers (density oscillation), is caused from the crossed electric field and magnetic field. This density wave is closely related with the size of the specimen and the concentration of carriers. In the case of 90% compensated germanium specimens having an impurity concentration of $1\times10^{15}$ to $1\times10^{16}$ atoms per cc. and having a cross-sectional area of about 1 square millimeter, and oscillatory electric field having a frequency in the order of 100 kc. to 1 mc. per second is developed when a magnetic field having a field strength in the order of 5000 oersteds is applied thereto. In case of a compensated InSb specimen having an impurity concentration of about $10^{17}$ to $10^{19}$ atoms per cc., oscillation in the order of 10 mc. to 10 gc. per second is developed when a magnetic field of the same intensity or of 5000 oersteds is applied thereto. In these cases, this phenomenon appears more effectively when the specimen is maintained at a temperature of liquid helium or liquid nitrogen.

Heretofore, the frequency and amplitude of this oscillation could have only been varied by varying the intensity of magnetic field, or by varying the impurity concentration, the compensation ratio or the size of a specimen.

It is therefore an object of the present invention to provide novel means capable of freely varying the frequency or amplitude of oscillation of low-temperature solid state oscillation devices.

Another object of the present invention is to provide a new mechanism for low-temperature solid state microwave oscillators.

The above and other objects, advantages and features of the present invention will become more apparent from the following description with reference to the accompanying drawings, in which.

Figure 1:
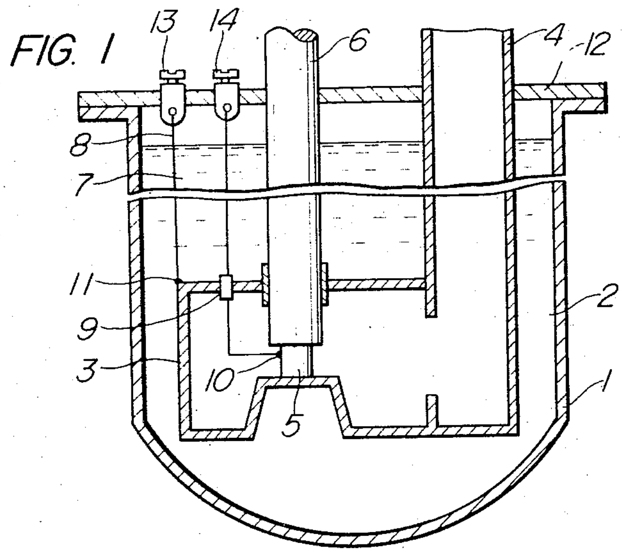
FIG. 1 is an enlarged vertical sectional view of part of an embodiment of the solid state oscillator according to the present invention.

An important feature of the present invention for attaining the various objects of the invention as described above is based on the finding that, when a uniaxial stress or a mechanical force is imparted to a low-temperature solid state oscillation device, the oscillation device oscillates at a lower oscillation frequency as the magnitude of the stress imparted thereto becomes greater.

It is considered that the above fact is derived from the following reasons.

Precisely, when a uniaxial stress is imparted to a low-temperature solid state oscillation device, the ionized impurity level in the oscillation device is subject to a great change and the Coulomb field around the ionized impurities is thereby contracted. This contraction of the Coulomb field results in lowering of the efficiency of momentum loss of the carriers running in a direction perpendicular to the direction of current flow and thus causes a reduction of the oscillation frequency even though the same electric field and the same magnetic field are continuously applied to the oscillation device.

In the case of the compensated germanium oscillation device having an impurity concentration of $10^{15}$ to $10^{16}$ atoms per cc., an oscillation electric field at a frequency between 100 kc. and 1 mc. per second is developed when a magnetic field having a field intensity in the order of 5000 oersteds is applied thereto, while in the case of the compensated InSb oscillation device having an impurity concentration of $10^{17}$ to $10^{19}$ atoms per cc., an oscillation of from 10 mc. to 10 gc. per second is developed when a magnetic field having a field strength of the order of 5000 oersteds is likewise applied thereto. Naturally these devices are maintained below the temperature of liquid nitrogen. Now, when a uniaxial stress of the order of 5000 kilograms per square centimeter is applied to this germanium oscillation device and a uniaxial stress in the order of 1000 kilograms per square centimeter is applied to this InSb oscillation device, the depth of their impurity level is reduced by about 80% and by about 50% respectively, and as a result, their oscillation frequency is reduced to a value which is one half to one third the original frequency.

The oscillation device is disposed in a microwave cavity together with means for applying a uniaxial stress to the devices and the cavity is accommodated in a low temperature bath. Means for applying a magnetic field to the device may be used by the usual magnet setting outside of the low temperature bath or means such as a superconductive magnet setting, inside the bath. In this latter case, an oscillator of remarkably small size can be obtained since means for applying the magnetic field can be placed in the low temperature bath.

The present invention offers many practical advantages in that an oscillator of low power consumption suitable for repeater means for microwave circuits and short-distance communications means can be obtained at low cost and in that, in case the oscillator is adapted to operate in a region of low frequency oscillation, a cryogenic device such as a cryotron or cryosar or other suitable cryogenic devices for use as an electronic computer element can easily be obtained through suitable combination with a superconductive magnet. The oscillator according to the invention can be combined with a low temperature detection means for interlocked operation therewith so as to serve as a local oscillator for low temperature electronic apparatus and can also be utilized as a detection oscillator which is operative to develop oscillation only when a signal input is supplied thereto.

Figure 2:
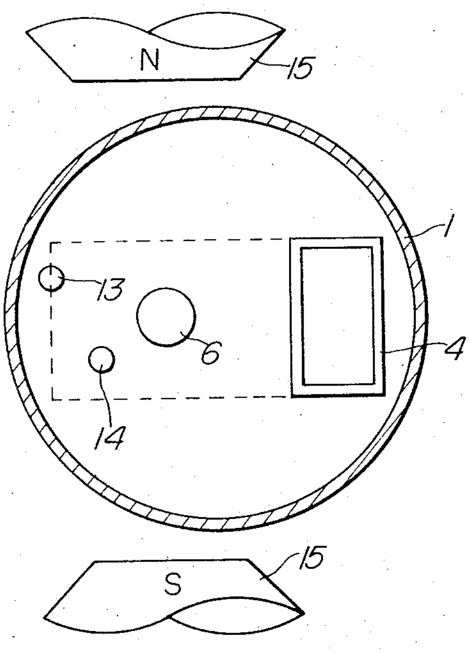
FIG. 2 is a top plan view of the oscillator of FIG. 1.

Referring now to FIGS. 1 and 2 of the drawings, an embodiment of the present invention will be described. FIGS. 1 and 2 are schematic arrangements showing the basic form of the low-temperature solid state oscillator according to the invention. The solid state oscillator includes a low temperature bath 1 which is filled with liquid nitrogen or liquid helium 2 and contains therein a cavity resonator 3 and a waveguide 4. An oscillation device 5 is disposed in the cavity resonator 3 and is contacted at its upper face by a push rod 6, which is electrically insulated material. One of the current leads 7 or 8 for the oscillation device 5 is connected to a point 10 adjacent to its upper end through an electrically insulated member 9 of a material, such as ceramics, while the other lead is connected to the wall of the cavity resonator 3 at a point 11. Current supply terminals 13 and 14 for the respective leads 8 and 7 are mounted on an upper cover 12 for the low temperature bath 1, and the push rod 6 and the waveguide 4 extend outwardly through the upper cover 12. A magnet 15 is disposed in a manner to apply a magnetic field to the oscillation device 5 in a direction transverse to the direction of current flow through the device 5.

In a practical test with the oscillator of the structure as outlined in the above and with an InSb oscillation device of a size of 2 mm. x 0.5 mm. x 0.5 mm. and having a tellurium concentration of about $10^{17}$ atoms per cc., a field oscillation in the order of 10 gc. per second was observed when a constant current of 1 ma. was made to flow through the oscillation device and a magnetic field having a field strength of the order of 3000 oersteds was applied in a direction transverse to the direction of current flow through the oscillation device. Then, when a uniaxial stress of about 4000 kilograms per square centimeter was produced in this oscillation device, its frequency of oscillation was reduced to about 5 gc. per second. Any desired frequency between 10 gc. and 5 gc. per second could be detected when a suitable uniaxial stress was produced in this oscillation device. Where it is desired to obtain a still higher oscillation frequency, the oscillation device may be disposed in an electric field of greater magnitude and a magnetic field of greater magnitude.

Another embodiment according to the present invention will next be described with reference to FIG. 3. In the previous embodiment, means for producing a high magnetic field had been used to establish the required magnetic field. However, as is commonly known, a large amount of power is required to establish a high magnetic field having a field intensity of more than 3000 oersteds, while it is a matter of difficulty to establish a stable magnetic field and to effect fine control of oscillation frequency. The present embodiment eliminates such difficulties and utilizes a superconductive magnet in lieu of the usual high field magnet as described above.

Figure 3:
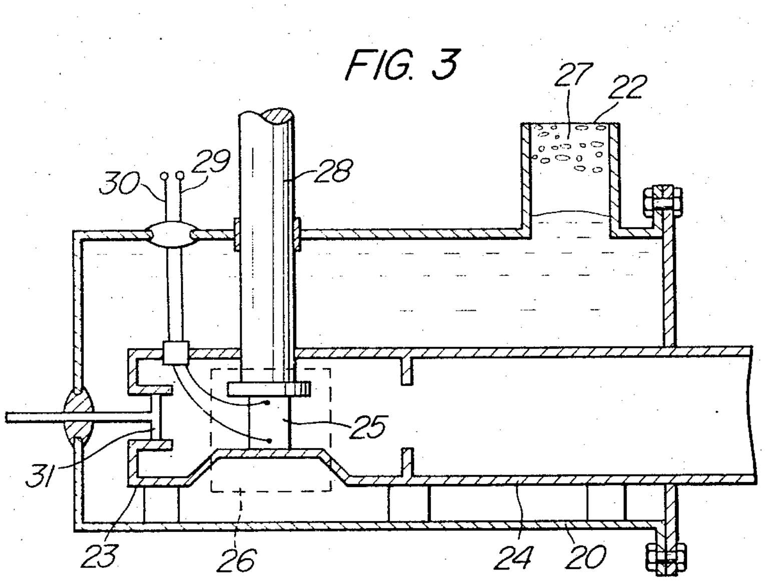
FIG. 3 is an enlarged vertical sectional view of part of another embodiment according to the present invention.

FIG. 3 shows a schematic arrangement of the low-temperature solid state oscillator including therein a coil of superconductive material. The oscillator comprises a low temperature bath 20 having an inlet 22 through which liquid nitrogen is filled into the bath 20. The bath 20 accommodates therein a cavity resonator 23, a waveguide 24, a solid state oscillation device 25 and a superconductive coil 26 of superconductive material. This superconductive coil 26 is shown by broken lines and is so positioned as to apply a magnetic field in a direction perpendicular to the view of the drawing of FIG. 3. A cover member 27 of quartz wool tightly closes the inlet 22 to the low temperature bath 20. A push rod 28 which can be operated from the exterior of the bath 20 produces a uniaxial stress in the oscillation device 25. Power supply to the oscillation device 25 is provided by leads 29 and 30 as shown. A short plunger 31 is provided to tune the suitable resonance frequency of the cavity resonator 24. In the present embodiment, the superconductive material must have a high critical magnetic field characteristic, because a high magnetic field having a field intensity of at least more than 3000 oersteds must be applied to the solid state oscillation device 25.

Figure 4:
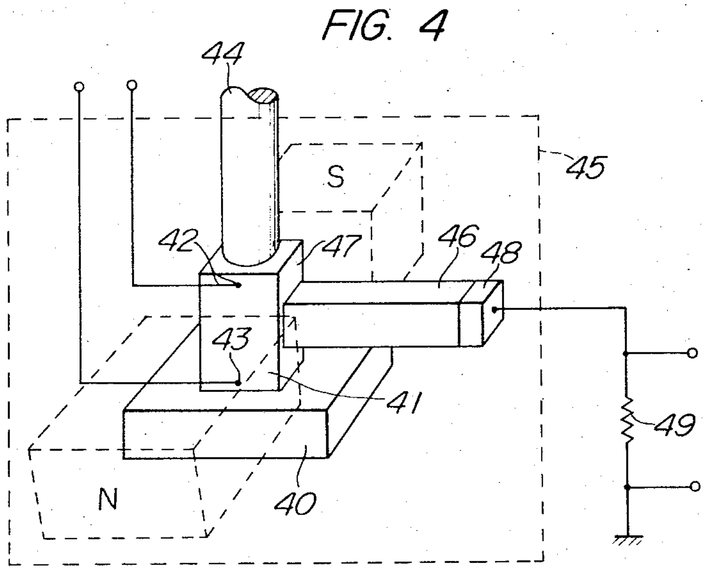
FIG. 4 is an enlarged perspective view of part of still another embodiment according to the present invention.

The above-described embodiments have referred to a case in which the oscillation frequency lies in the microwave region and therefore the output from the oscillation device can be taken outwardly from the oscillator through a waveguide. When, however, the oscillation frequency is quite low or in the order of 1 mc. per second, the waveguide is no longer useful. Another embodiment as shown in FIG. 4 proposes an effective method for taking out an output in case of such low frequency oscillation. In FIG. 4, part of the embodiment is schematically shown in an enlarged perspective fashion. The oscillator according to this embodiment includes base plate 40 of electrically insulated material such as quartz glass which serves as a mounting base for a solid state semiconductor oscillation device 41. Two electrodes or current terminals of the oscillation device 41 are designated by 42 and 43. A push rod 44 acts to impart a uniaxial stress of desired magnitude to the oscillation device 41. An ordinary electromagnet as designated by N and S may be employed as a means for applying a magnetic field to the oscillation device 41, or alternatively a superconductive magnet may be employed since the entire assembly as shown by broken lines 45 can be placed in a low temperature bath containing liquid nitrogen therein. A semiconductor bar 46 has one of its end face brought into contact with a side face 47 of the oscillation device 41, while a PN junction 48 is formed at the other end of the semiconductor bar 46 and is grounded through a load resistance 49. The side face 47 of the oscillation device 41 is polished to a mirror finish and the opposite face of the semiconductor bar 46 is made optically parallel to the side face 47.

Suppose now a compensated germanium specimen of a size of 5 mm. x 3 mm. x 3 mm. and having an impurity concentration of about $10^{15}$ atoms per cc. is employed as the semiconductor oscillation device 41, and while causing to flow a constant current of about 1 to 3 ma. across the oscillation device in its non-stressed state, a magnetic field having a field intensity in the order of 5000 oersteds is applied in a direction transverse to the direction of the above current flow. Then a field oscillation in the order of 100 kc. per second takes place in the oscillation device. The direction of this field oscillation is at right angles with respect to the direction of current flow and the direction of magnetic field. Accordingly by disposing the semiconductor bar 46 in a manner that it lies in the direction of the oscillating electric field, the field oscillation propagates through the semiconductor bar 46 and is converted into an oscillating current by the PN junction 48 provided at the end of the semiconductor bar 46, which current then flows across the load resistance 49. Therefore, a voltage oscillation of the same frequency, or 100 kc. per second, as that taking place in the oscillation device 41 is detected across the load resistance 49.

When under the above conditions a uniaxial stress of about 5000 kilograms per square centimeter is applied to the oscillation device 41 by means of the pressure imparting rod 44, the frequency of oscillation in the oscillation device 41 is caused to vary with the result that the voltage oscillation appearing across the load resistance 49 varies correspondingly and its frequency is reduced to about one half the original frequency.

Hitherto, any variation in the oscillation frequency or output of an oscillation device of a material such as germanium or InSb at low temperatures under application of a magnetic field thereto has not been possible except by varying the intensity of the magnetic field, and the oscillation frequency or output has still been restricted by the impurity concentration and the size of the oscillation device. However, it will be understood that, according to the invention, the frequency or output of such oscillation devices can easily be varied by merely applying a uniaxial stress thereto. Further, in the prior method in which the magnetic field intensity is varied to obtain a required frequency or output, desired variation in the frequency is only possible after the solid state oscillation device is assembled in the oscillator. In the prior type of solid state oscillators, a large amount of power is consumed in producing a magnetic field having a great intensity and it is a matter of extreme difficulty to effect fine control of the oscillation frequency under the magnetic field having such a great intensity. According to the invention, however, fine control of stress can be imposed on the oscillation device, hence fine control of oscillation frequency may easily be effected by use of a threaded push rod.

Germanium, silicon, InSb and PbTe are typical semiconductor materials preferably used in the present invention. An impurity concentration in the semiconductor material of $10^{14}$ to $10^{15}$ atoms per cc. and a compensation ratio of more than 50% are most preferred in the present invention, but these values are not critical values at all. Oscillation can likewise take place at a lower impurity concentration than the above value and at a compensation ratio of less than 50%—creating some reduction in efficiency. It is to be added that the low temperature referred to hereinbefore indicates a temperature below 77° K.

What is claimed is:

1. A solid state oscillator comprising a compensated semiconductor device kept at a low temperature, means for supplying direct current through said semiconductor device, means for applying a magnetic field in a direction substantially transverse to the direction of flow of said current, means for guiding outwardly from said semiconductor device the oscillation output developed in said semiconductor device by the action of said current supplying mean and said magnetic field applying means, and means for applying an adjustable mechanical force to said semiconductor device independent of the environmental conditions in which the device is situated for thereby controlling the oscillation frequency of said oscillation output.

2. A solid state oscillator according to claim 1, in which said magnetic field applying means is a superconductive electro-magnet.

3. A solid state oscillator according to claim 1, in which said mechanical force is a uniaxial mechanical force.

4. A solid state oscillator according to claim 3 in which the direction of the uniaxial mechanical force is parallel to the direction of the current flowing through the semiconductor device.

5. A solid state oscillator according to claim 3, in which the mechanical force is imparted by a screw-rod to the surface of semiconductor device.

6. A solid state oscillator according to claim 1, in which the semiconductor material consists of a material selected from the group of InSb, Si, Ge and PbTe.

7. A solid state oscillator according to claim 4 in which the semiconductor material consists of a material selected from the group of InSb, Si, Ge and PbTe.

8. A solid state oscillator according to claim 1, wherein the means for guiding outwardly the oscillation output comprises a wave guide element.

9. A solid state oscillator according to claim 1, wherein the means for guiding outwardly the oscillation output comprises a second semiconductor bar terminating in a p–n junction.

10. A solid state oscillator according to claim 7, wherein the means for guiding outwardly the oscillation output comprises a wave guide element.

11. A solid state oscillator according to claim 7, wherein the means for guiding outwardly the oscillation output comprises a second semiconductor bar terminating in a p–n junction.

References Cited

UNITED STATES PATENTS

| | | | |
|---|---|---|---|
| 2,944,167 | 7/1960 | Mataré | 331—107 X |
| 3,293,567 | 12/1966 | Komatsubara et al | 331—107 |

OTHER REFERENCES

Buck, "The Cryotron-A Superconductive Computer Component," Proceedings of the IRE, April 1956, pages 482–485.

ROY LAKE, *Primary Examiner.*

S. H. GRIMM, *Assistant Examiner.*